United States Patent [19]
Bendall

[11] 4,190,138
[45] Feb. 26, 1980

[54] AUTOMATIC CLUTCH

[76] Inventor: Wilfrid H. Bendall, 48-18 432rd St., Woodside, N.Y. 11377

[21] Appl. No.: 866,276

[22] Filed: Jan. 3, 1978

[51] Int. Cl.² .................... F16D 41/06; F16D 41/10
[52] U.S. Cl. ................................. 192/43; 192/41 A; 192/41 S; 192/45.1; 188/82.2; 188/82.8
[58] Field of Search ............... 192/41 R, 41 A, 41 S, 192/43, 74, 45.1; 188/82.2, 82.6, 82.8

[56] References Cited
U.S. PATENT DOCUMENTS

| | | | |
|---|---|---|---|
| 2,075,130 | 3/1937 | Osterholm | 192/45.1 X |
| 2,689,633 | 9/1954 | Turner | 192/41 A |
| 2,845,159 | 7/1958 | Stephenson | 192/45.1 X |
| 3,061,060 | 10/1962 | Stephenson | 192/41 A |
| 3,311,204 | 3/1967 | Barnard | 192/41 A |
| 3,543,895 | 12/1970 | Klees | 192/45.1 |

FOREIGN PATENT DOCUMENTS

710060  9/1941  Fed. Rep. of Germany .......... 192/45.1

*Primary Examiner*—Allan D. Herrmann

[57] ABSTRACT

A toothed drive gear is provided with a concentric resilient element having corrugations engaged by the teeth of the gear. Rotation of the gear wedges the resilient element into graduated traction with the bore of a concentric annular driven member. The driven member can overrun the drive member in either direction of rotation.

10 Claims, 3 Drawing Figures

AUTOMATIC CLUTCH

SUMMARY OF THE INVENTION

This invention relates generally to clutches for mechanical power transmission and is an adaptation of the flexible coupling principle which was the subject of U.S. Pat. No. 4,047,395 issued Sept. 13, 1977 to the present inventor.

Automatic clutches, in principle, facilitate starting of motors and machines involving acceleration of high inertia loads by gradually picking up the load as the driver speed increases. They thus reduce power consumption by enabling the use of smaller prime movers, economically proportioned for running rather than starting loads. While the prior art discloses numerous clutch constructions of varying specific bulk, complexity and cost for this purpose, advances in the field of mechanical power transmission emphasize the need for an automatic clutch of simpler, more compact, lower cost manufacture, with correlated high mechanical efficiency, reliability and endurance. More particularly an automatic clutch able to accommodate drive misalignment, shocks and torsional and axial vibration. Inclusion of these essential characteristics with ability to engage automatically and accommodate overrunning of the driven member in either direction of rotation would further convey exceptional functional versatility. Accordingly, an automatic clutch with these performance characteristics is to be understood as the primary object of the present invention, as will be apparent to those knowledgeable in the art following reference to the accompanying description, drawing figures and claims of this specification.

THE DRAWINGS

DETAILED DESCRIPTION

Figure 1:
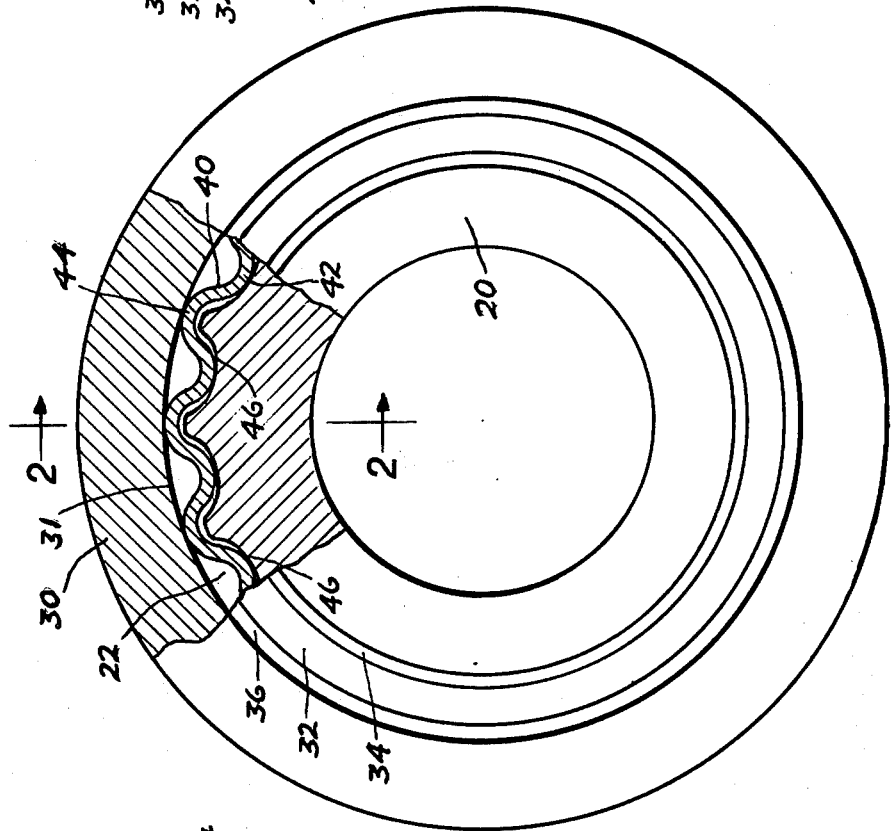
FIG. 1 is a partly sectioned side elevational view of an automatic clutch embodying the present invention.
Figure 2:
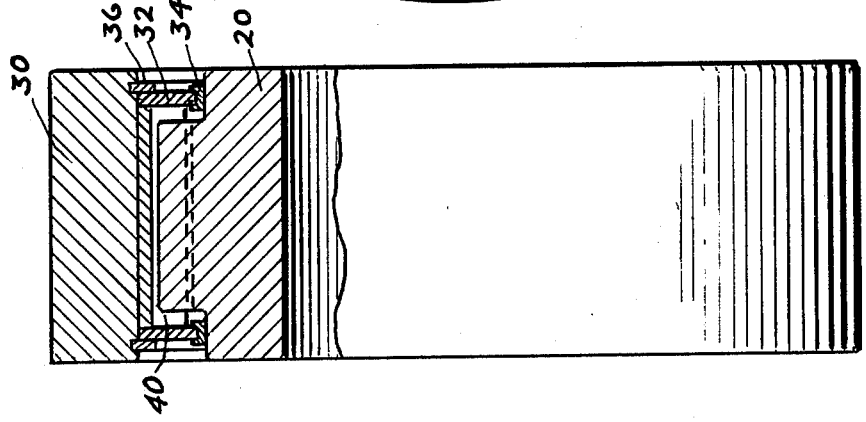
FIG. 2 is a partly section cross-sectional view taken on the line 2—2 of FIG. 1.

Referring to the drawings, FIGS. 1 and 2 show the basic form of the clutch of this invention. Reference numeral 20 designates the externally toothed gear structure constituting the clutch drive hub, adapted to mount on the shaft of a motor. Numeral 30 designates the concentric outer annular clutch member for attachment to a driven member. These members assemble as shown, with a radial space 22 between them, and are interconnected by the corrugated resilient element 40, preferably constructed of hardened and tempered spring steel. The resilient element is in sprung retention on the gear with internal corrugation portions 42 initially centered between adjacent gear teeth and in bearing contact with the root portions 46 of the teeth. External, alternating, corrugation portions 44 are simultaneously in bearing contact with the internal periphery 31 of the annular outer member 30. The root portions of the gear teeth are shaped to function as cam surfaces for wedging the corrugated element into radial engagement pressure with the outer clutch member when driving torque is applied to the gear. This action is facilitated by the structural expansibility of the corrugated member. Normally, with clearance space 22 supplied with a suitable lubricant, transmission of a driving torque to the outer member is effected gradually as determined by the cam wedge pressures and the time required to break through a lubricating film into tractive contact with the bore 31. With rotation of the gear in either direction, since the geometry of each cam and corrugation portion on the gear is symmetrical with respect to a radial line centered between adjacent gear teeth, the frictional drag of the external corrugation portions at their contact with the bore moves the element out of its initial symmetry into cam-engendered pressure with the bore. This action is supplemented by the radial and circumferential expansion of the element in response to the centrifugal force of rotation.

It may be observed here that the resilient element of the clutch of this invention functions essentially as a continuous flexible sprag—as contrasted with the rigid sprag elements of the well known one-way clutches. The latter require high precision in manufacture and their essential rigidity limits their ability to accommodate misalignment and shock and vibration. The flexible sprag of the present invention is simpler to manufacture (the element is easily formed by running pretempered spring steel strip between a pair of gears) is less restricted in design axial length than rigid sprag members, has lower operating stresses and is inherently better adapted to cope with adverse drive conditions.

Figure 3:
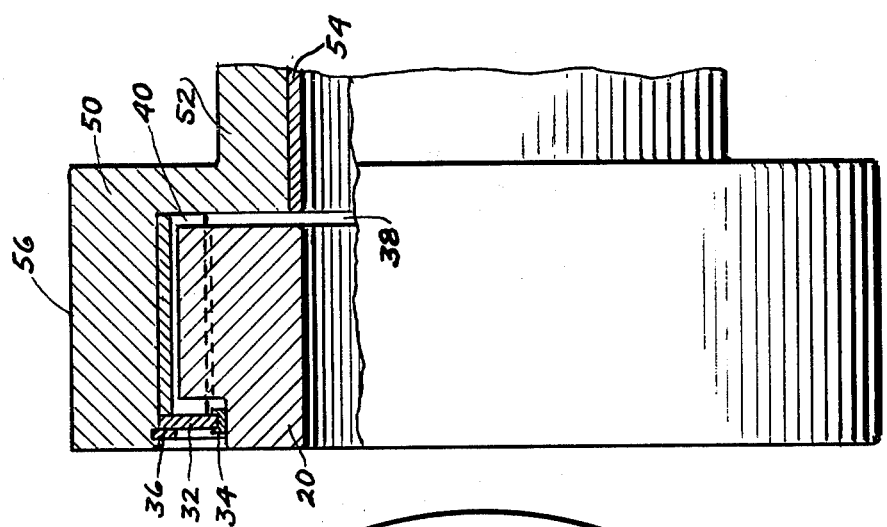
FIG. 3 is a partly sectioned side elevational view of the clutch with an extended hub portion.

Industrial and automotive applications of this clutch can utilize the simple embodiment shown in FIG. 2. The gear 20 mounts directly on a drive shaft. The corrugated element 40 is retained in the bore of the outer member 30 by end closure rings 32 with seals 34 and snap rings 36. Clearances 38 provide for axial float of the outer member. Since the corrugations of the resilient element are relatively long axially they can be utilized as a direct bearing for rotation of the outer member without further support and the latter can be provided with integral gear, sprocket or belt engagement means. Other industrial applications may use the modified design shown in FIG. 3 with outer member 50 having an extended hub portion 52. The clutch of this arrangement also mounts directly on a motor or drive shaft and incorporates a sleeve bearing 54 to support the extended hub. The rim 56 of the outer member can be utilized to brake rotation of the clutch.

The overrunning facility of the clutch of this invention may best be understood by refrence again to the sectioned portion of FIG. 1. Since, as described above, the corrugated element is in sprung retention on the gear with internal corrugation portions centered on the symmetrical cam contours of the gear tooth spaces, it will be energized only by rotation of the gear, plus the centrifugal force of rotation. The outer member, with its continuously lubricated bearing on the external corrugation portions, normally will not generate sufficient frictional drag to move the relatively stiff corrugated element out of its centered (or neutral) position on the gear periphery and thus can overrun the inner assembly in either direction of rotation. Use can be made of this novel double-direction drive and overrunning facility as an economical substitute for the differential gear on drive axles of mobile equipment.

The forms of this invention herewith shown and described are to be taken as preferred examples of the same and it is to be understood that various changes may be made in the shape, size and arrangement of the parts within the scope of the appended claims:

What is claimed is:

1. An automatic clutch for connecting a driving and a driven member, said clutch comprising an externally toothed gear for connection to one of said members, a concentric annular member for connection to the other of said members, said annular member having an internal diameter substantially larger than the external diameter of the gear to provide a radial clearance space therebetween, a corrugated resilient element having internal and external portions fitted in said space and in sprung retention on the gear with internal corrugation portions initially in centered contact with the root portions of the gear teeth alternating with external corrugation portions in contact with the internal periphery of the annular member.

2. The clutch of claim 1 wherein root portions of the gear teeth are contoured to comprise cam surfaces for wedging the resilient element into contact with the internal periphery of the annular member.

3. The clutch of claim 2 wherein the cam contours are disposed symmetrically on each side of the corrugation contact thereon.

4. The clutch of claim 2 wherein the internal corrugation portions are in centered bearing contact between adjacent gear teeth.

5. The clutch of claim 1 wherein the resilient element is adapted to expand radially and circumferentially in response to gear pressures.

6. The clutch of claim 1 wherein the resilient element is adapted to expand radially and circumferentially in response to centrifugal force.

7. The clutch of claim 1 wherein external corrugation portions constitute a bearing for independent rotation of the annular member.

8. The clutch of claim 1 wherein the internal periphery of the annular member constitutes a bearing for independent rotation of the gear and resilient element assembly.

9. The clutch of claim 1 wherein the external periphery of the annular member constitutes a braking surface for braking rotation of the clutch.

10. The clutch of claim 1 wherein the annular member is engaged by rotation of the gear in either direction of rotation and can disengage and overrun the gear in either direction of rotation.

* * * * *